US006950275B1

(12) United States Patent
Ali et al.

(10) Patent No.: US 6,950,275 B1
(45) Date of Patent: Sep. 27, 2005

(54) DISK DRIVE HAVING COVER ASSEMBLY WHICH COMPRESSES A FOAM MEMBER BETWEEN SUBSTANTIALLY PLANAR RIGID MEMBERS

(75) Inventors: David Ali, San Jose, CA (US); Claire-Nechol W. E. Sevier, Hayward, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 419 days.

(21) Appl. No.: 10/183,208

(22) Filed: Jun. 26, 2002

(51) Int. Cl.$^7$ ............................................. G11B 33/14
(52) U.S. Cl. ................................. 360/97.02; 720/651
(58) Field of Search .......................... 360/97.01, 97.02, 360/97.03; 720/600, 651

(56) References Cited

U.S. PATENT DOCUMENTS

| | | | | |
|---|---|---|---|---|
| 4,491,888 | A * | 1/1985 | Brown et al. ............ | 360/97.03 |
| 5,150,267 | A * | 9/1992 | Reinisch .................. | 360/97.02 |
| 5,214,549 | A | 5/1993 | Baker et al. | |
| 5,282,100 | A | 1/1994 | Tacklind et al. | |
| 5,510,954 | A * | 4/1996 | Wyler ........................ | 361/685 |
| 5,598,306 | A * | 1/1997 | Frees et al. .............. | 360/97.02 |
| 5,666,239 | A * | 9/1997 | Pottebaum ................ | 360/97.03 |
| 5,982,580 | A | 11/1999 | Woldemar et al. | |
| 6,177,173 | B1 * | 1/2001 | Nelson ...................... | 428/137 |
| 6,256,163 | B1 | 7/2001 | Schmidt et al. | |
| 6,288,866 | B1 | 9/2001 | Butler et al. | |
| 6,377,420 | B1 * | 4/2002 | Tadepalli et al. ........ | 360/97.02 |
| 6,407,879 | B1 * | 6/2002 | Fruge' et al. ............. | 360/97.02 |
| 6,498,700 | B2 * | 12/2002 | Takahashi et al. ....... | 360/97.01 |
| 6,501,615 | B1 * | 12/2002 | Kelsic et al. ............ | 360/97.02 |
| 6,525,931 | B2 * | 2/2003 | Yagenji et al. ............ | 361/685 |
| 6,529,345 | B1 * | 3/2003 | Butler et al. ............. | 360/97.01 |
| 6,724,566 | B2 * | 4/2004 | Kant et al. ................ | 360/97.01 |
| 2001/0028525 | A1 * | 10/2001 | Lofstrom et al. ........ | 360/97.01 |
| 2001/0038509 | A1 | 11/2001 | Loftstrom et al. | |
| 2002/0001155 | A1 * | 1/2002 | Takahashi et al. ....... | 360/97.01 |
| 2002/0141108 | A1 * | 10/2002 | Daniel et al. ............ | 360/97.01 |
| 2003/0058572 | A1 * | 3/2003 | Kant et al. ................ | 360/97.01 |

FOREIGN PATENT DOCUMENTS

| | | | | |
|---|---|---|---|---|
| JP | 10207571 A | * | 8/1998 | ............ G06F 1/16 |
| JP | 11232832 A | * | 8/1999 | ........... G11B 25/04 |
| JP | 2000049471 A | * | 2/2000 | ............ H05K 5/03 |
| JP | 2001216774 A | * | 8/2001 | ........... G11B 33/08 |
| JP | 2002157858 A | * | 5/2002 | ........... G11B 25/04 |
| WO | WO 9600964 A1 | * | 1/1996 | ......... G11B 05/012 |
| WO | WO 200173788 A1 | * | 10/2001 | ............ C08J 05/18 |

* cited by examiner

Primary Examiner—William J Klimowicz
(74) Attorney, Agent, or Firm—Blakely Sokoloff Taylor & Zafman

(57) ABSTRACT

A disk drive including a head disk assembly in communication with a printed circuit board assembly, and further includes a disk drive base and a disk drive cover assembly collectively housing a head stack assembly and a data storage disk mounted on a spindle motor assembly for rotating the storage disk. The disk drive cover assembly further includes first and second substantially-planar rigid members having major surfaces, a compressible member of a foam composition placed in between the major surfaces wherein the compressible member is characterized by an unconstrained thickness d1, and wherein the major surfaces and the compressible member are fixed in a stacked relationship to compress the compressible member to a thickness less than d1. The head disk assembly further includes structure for fixing the disk drive cover assembly to the head stack assembly and the spindle motor assembly.

20 Claims, 3 Drawing Sheets

DISK DRIVE HAVING COVER ASSEMBLY WHICH COMPRESSES A FOAM MEMBER BETWEEN SUBSTANTIALLY PLANAR RIGID MEMBERS

FIELD OF THE INVENTION

The present invention relates to disk drives. More particularly, this invention pertains to a disk drive including a cover assembly which compresses a foam member between substantially planar rigid members.

BACKGROUND OF THE INVENTION

Disk drives are commonly employed in workstations, personal computers, portables and other computer systems to store large amounts of data in a readily-available form. Typically, the primary components of a disk drive are a head disk assembly and a printed circuit board assembly which when fixed to one another form a functional unit that is then connected to a computer, such as by insertion into a bay of a host computer.

The head disk assembly includes a base and a cover which collectively house a head stack assembly and a data storage disk mounted on a spindle motor assembly for rotating said storage disk, and an actuator arrangement, driven by a voice coil motor, for advancing a read/write head. A flex circuit transmits data signals to and from the read/write head of the actuator.

The operation of a hard disk drive necessarily generates noise such as airborne and structure borne noises. For example, the electromagnetic spindle and the electromechanical voice coil motors drive the device with the spindle motor continually rotating the storage disk(s), and the voice coil motor selectively driving the actuator(s) to position the read/write heads. The motors transmit resonances throughout the disk drive, creating structural vibrations and acoustical, audible noise of varying frequencies. Such noise is transmitted to other part of the disk drive such as the housing, the cover and the substantially-planar printed circuit board, which in turn, can amplify resonant frequency sound intensity, in effect acting as a speaker diaphragm.

The presence of acoustic noise in an operating disk drive is undesirable. Customers perceive loudness as an indication of lower quality. As such, acoustic characteristics may serve as a benchmark of product quality. Furthermore, the ever-increasing operational speed of computers mandates reductions in the data access time from disk drives, resulting in increases in the speed of spindle motor which in turn intensifies the overall disk drive noise. In addition, acoustics standards, such as those of the internationally-recognized European International Standards Organization ("ISO"), are regularly lowered, forcing manufacturers to design disk drives characterized by reduced acoustic noise.

Currently, one form reducing the noise associated with the operation of a disk drive is by use of visco-damping materials. Typically, a layer of visco-damping material, such as a plastic damping material, is located in various regions of the disk drive, such as in the cover, to dampen the noise generated by the operation of the disk drive.

While widely used in the art, the visco-damping materials are not without shortcomings. The damping capability of a layer of visco-damping material composition is related to the thickness of the layer but in such way that while increasing the thickness improves the attenuation capabilities of the layer for the airborne noises, it is not optimized for structure-borne noises. Conversely, while decreasing the thickness improves the attenuation capabilities of the layer for structure-borne noises, it decreases the same for airborne noises. Thus in determining the thickness of a visco-damping material for damping the overall noise associated with the operation of a disk drive, a trade-off must be disadvantageously made between the damping of structure-borne noises and airborne noises, and therefore impairing the usage of a visco-damping material to its full potential for damping of either noise.

Accordingly, what is needed is a noise-damping material that allows for increasing the damping of both structure-borne noises and airborne.

SUMMARY OF THE INVENTION

This invention can be regarded as a disk drive cover assembly for damping noise associated with operation of a disk drive. The cover assembly includes first and second substantially-planar rigid members each having a major surface. The cover assembly further includes a compressible member of a foam composition placed in between the major surfaces wherein the compressible member is characterized by an unconstrained thickness d1. The cover assembly further includes means for fixing the major surfaces and the compressible member in a stacked relationship such that the compressible member is compressed to a thickness of less than d1.

This invention can also be regarded as a disk drive that includes a head disk assembly in communication with a printed circuit board assembly. The head disk assembly includes a disk drive base and a disk drive cover assembly collectively housing a head stack assembly and a data storage disk mounted on a spindle motor assembly for rotating the storage disk. The disk drive cover assembly further includes first and second substantially-planar rigid members having major surfaces, a compressible member of a foam composition placed in between the major surfaces wherein the compressible member is characterized by an unconstrained thickness d1, and means for fixing the major surfaces and the compressible member in a stacked relationship to compress the compressible member to a thickness less than d1. The head disk assembly further includes means for fixing the disk drive cover assembly to at least one of the head stack assembly and the spindle motor assembly.

DETAILED DESCRIPTION OF THE INVENTION

Figure 1:
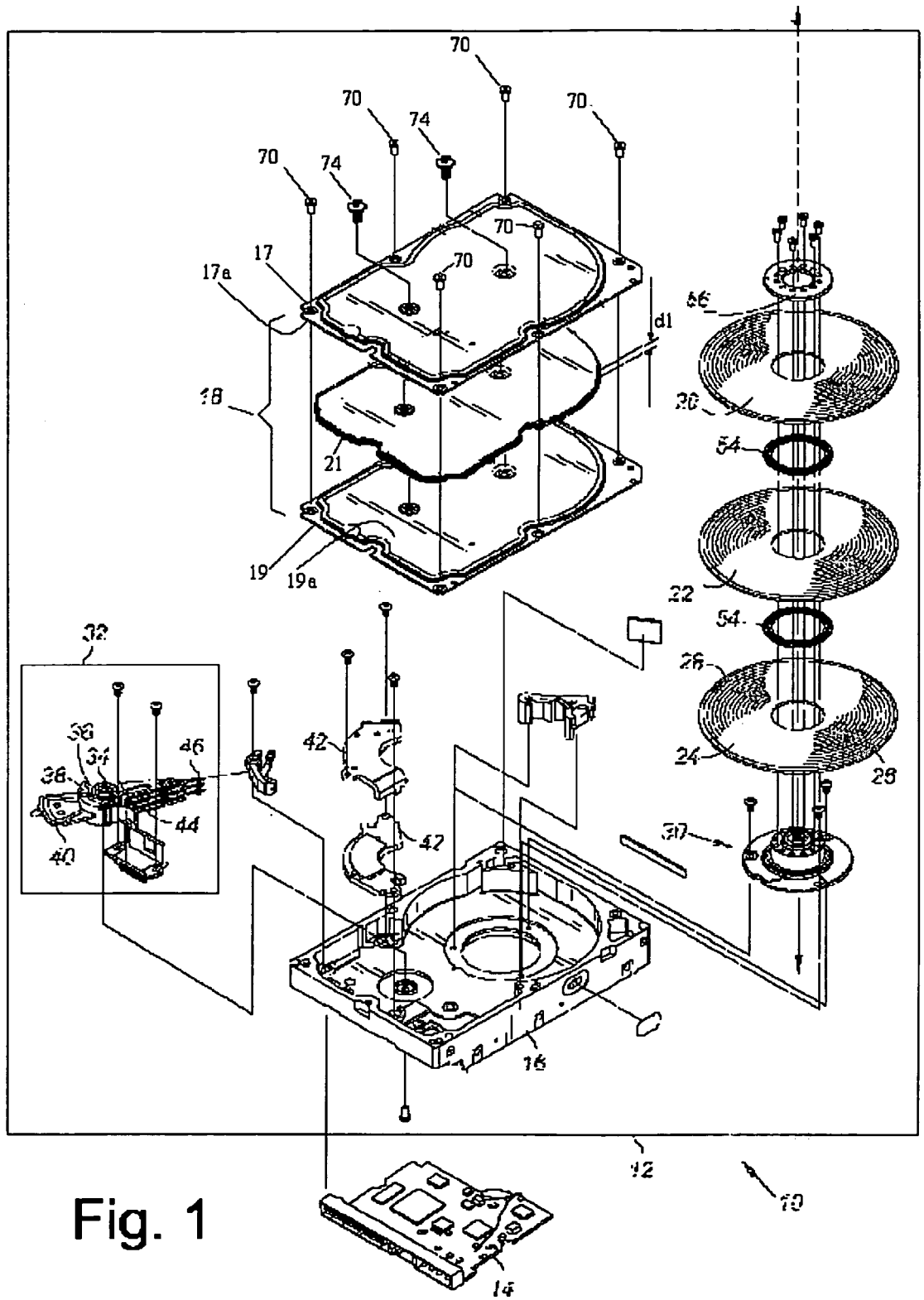
FIG. 1 is an exploded perspective view of a disk drive including a head disk assembly having a cover assembly which compresses a foam member between substantially planar rigid members.

With reference to FIG. 1, a disk drive 10 according to a preferred embodiment of the present invention includes a head disk assembly 12 that is in communication with a printed circuit board assembly 14. The head disk assembly 12 includes a disk drive base 16 and a disk drive cover assembly 18 collectively housing a head stack assembly 32 and data storage disks 20, 22 and 24 mounted on a spindle motor assembly for rotating the storage disks 20, 22 and 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side and a track 28 (shown in phantom) on a lower facing side. The spindle motor assembly includes a spindle motor 30, spacers 54 for separating the disks and a clamp 56 to secure the disks and prevent slippage.

The disk drive cover assembly 18 includes first and second substantially-planar rigid members 17 and 19 having major surfaces 17a (shown in phantom) and 19a, respectively. The disk drive cover assembly 18 further includes a compressible member 21 of a foam composition that is placed in between the major surfaces 17a and 19a. As shown in FIG. 1, the compressible member 21 is characterized by an unconstrained thickness d1. The compressible member 21 may be suitably fabricated of a polyvinyl chloride foam composition or a polyethylene foam composition or other foam materials providing comparable benefits. The compressible member 21 is also preferably fabricated of a composition of an open cell type, closed cell type, semi-open cell type or semi-closed cell type. The compressible member 21 is preferably fabricated with an unconstrained thickness d1 of 0.003 inches, and covers the head stack assembly 32, the data storage disks 20, 22 and 24 and the spindle motor assembly. The disk drive cover assembly 18 further includes fixing means, such as screws 70 or adhesive as described in FIG. 2, for fixing the major surfaces 17a, 19a and the compressible member 21 in a stacked relationship to compress the compressible member 21 to a thickness of less than d1, preferably to compressed thickness of (d1)/3. The head disk assembly 12 further includes fixing means, such as screws 74, for fixing the disk drive cover assembly 18 to at least one of the head stack assembly 32 and the spindle motor assembly, such as to clamp 56 in the spindle motor assembly.

As shown in FIG. 1, the head stack assembly 32 further includes a pivot-bearing cartridge 34 and a rotary actuator 36. The rotary actuator 36 includes an actuator body 38 that has a bore and the pivot-bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a Voice Coil Motor (VCM) for pivoting the rotary actuator 36. A plurality of actuator arms, the lowermost one of which being denoted 44, extend from an opposite side of the actuator body 38. As the disks 20, 22, 24 may be two sided, each of the actuator arms is attached to either one or two head gimbal assemblies associated with the adjacent sides of the disks 20, 22, 24. Each head gimbal assembly includes a head (the uppermost one being denoted 46) for reading and writing data to and from a respective recording surface of one of the respective disks 20, 22, 24.

Figure 2:
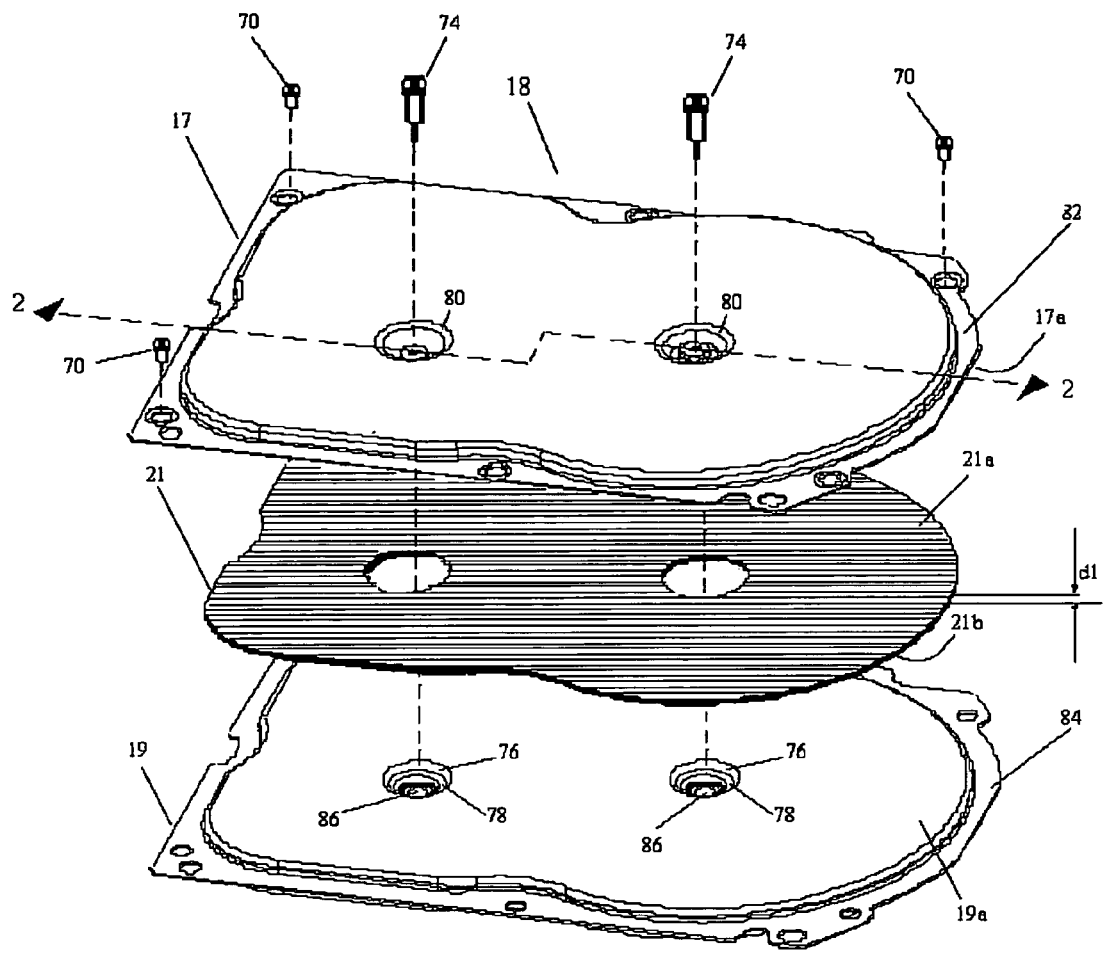
FIG. 2 is an exploded perspective view of a cover assembly which compresses a foam member between substantially planar rigid members.

With reference to FIG. 2, an exploded perspective view is provided of the disk drive cover assembly 18 which compresses compressible member 21 of thickness d1 between planar rigid members 17 and 19 having major coextensive surfaces 17a (shown in phantom) and 19a, respectively. Planar rigid members 17 and 19 are of like extent, shape and arranged in stacked relationship with the compressible member 21 such that the surface 17a (shown in phantom) of member 17 contacts the upper surface 21a of compressible member 21 and the surface 19a of member 19 contacts the lower surface 21b (shown in phantom) of compressible member 21. Fixing means are also provided for fixing the major surfaces 17a and 19a, and the compressible member 21 in a stacked relationship such that the compressible member is compressed to a thickness of less than d1, such as to (d1)/3, as shown in the cross-sectional views FIGS. 3A–B of an assembled cover assembly taken at line 2—2 of FIG. 2. Preferably, the fixing means includes a plurality of downwardly convex bosses 80 formed on one of the major surface 17a, and a plurality of receiving complementary cavities 76 formed on the major surface 19a wherein each boss 80 is aligned and positioned for pairing with one of the cavities 76, and wherein the means for fixing the major surfaces comprises an adhesive such as a epoxy applied to at least one of the bosses 80 and the cavities 76 for adhering the bosses 80 to the cavities 76. Preferably, each cavity 76 also includes a trough 78 for containing excess adhesive. The bosses 80 are preferably sized so that the compressible member 21 is compressed to one third of its unconstrained thickness (i.e. (d1)/3).

Additionally, as shown in FIG. 2, the planar rigid members 17 and 19 have each a plurality of edges 82 and 84, respectively, and a plurality of fasteners 70, such as screws, associated with the edges for securing the planar rigid members 17 and 19 to each other, and in a preferred embodiment, for securing the overall disk drive cover assembly 18 to the disk drive base 16 as well. The planar rigid members 17 and 19 are preferably fabricated with matching, aligned apertures and cutouts in the edges 82 and 84 for passage of the screws 70. The planar rigid members 17 and 19 are preferably of a stainless steel or aluminum composition or other dense corrosion-resistant material of nominal thickness to minimize size.

The disk drive cover assembly 18 further includes fixing means, such as screws 74, for fixing the disk drive cover assembly 18 to at least one of the head stack assembly 32 and the spindle motor assembly, such as to clamp 56 in the spindle motor assembly. Preferably, a plurality of openings 86 are provided in the disk drive cover assembly 18 with each opening 86 positioned over a corresponding screw-hole bored in a predetermined surface of a member in each of the head stack assembly 32, such as a top surface of the pivot-bearing cartridge 34, and the spindle motor assembly, such as a top surface of clamp 56. The means for fixing the disk drive cover assembly 18 includes a plurality of downwardly-directed screws 74 each of which are received in the corresponding screw-holes through the openings 86 to secure the disk drive cover assembly 18 to the head stack assembly 32 and the spindle motor assembly. Preferably, openings 86 in disk drive cover assembly 18 are provided in the form of matching, aligned apertures and cutouts in each of the compressible member 21, bosses 80 and cavities 76 for passage of screws 74 as shown in FIG. 2.

Figure 3A:
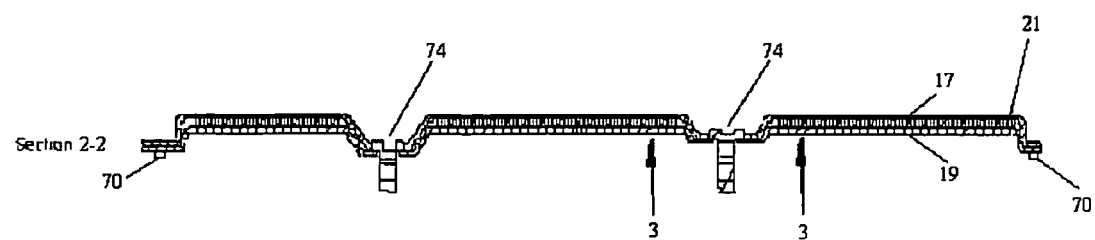
FIGS. 3A–3B are side elevation views in a cross-section of an assembled disk drive cover assembly in accordance with FIG. 2.
Figure 3B:
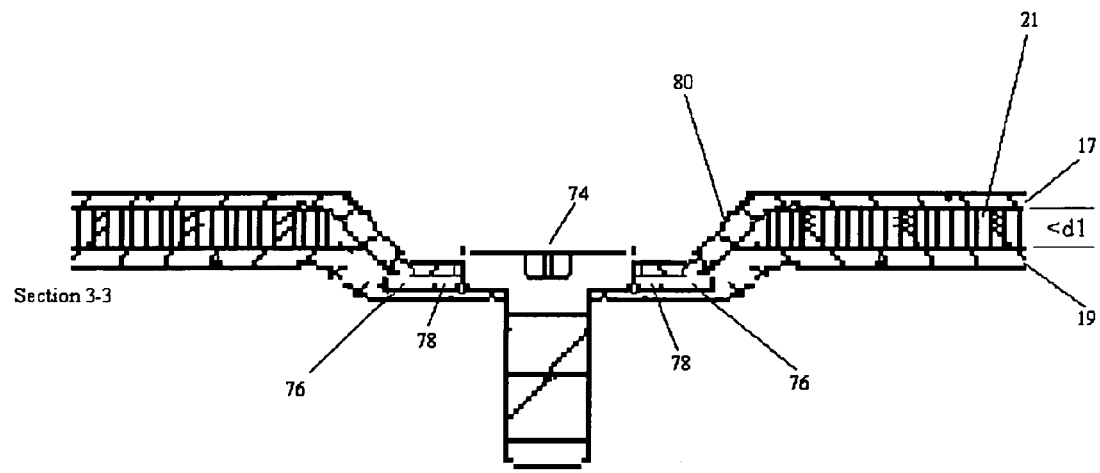

With reference to FIG. 3A, a cross-sectional view of an assembled cover assembly taken at line 2—2 of FIG. 2 is shown in which the compressible member 21 is compressed to a thickness of less than d1, as also shown in FIG. 3B illustrating a magnified 3—3 portion of cross-sectional view of FIG. 3A. As shown in FIG. 3B, each boss 80 is preferably sized so that the compressible member 21 is compressed to one third of its unconstrained thickness (i.e. (d1)/3), preferably to a thickness of 0.001 inches. Adhesive materials such as epoxy are applied to each of annular cavities 76 for adhering the bosses 80 to the cavities 76, and therefore to fix the major surfaces 17a and 19a and the compressible member 21 in a stacked relationship. Preferably, each annular cavity 76 also includes an annular trough 78 for containing excess overflow adhesive. By compressing the compressible member 21, the disk drive cover assembly 18 acts to absorb generated acoustic and structural noise associated with the operation of the disk drive 10. One advantage of the foregoing feature of the present invention over the prior art is that the compressed foam of polyvinyl chloride composition allows for advantageous increasing in the damping of both structure-borne noises and airborne noises, and therefore the thickness of the foam layer can be increased as needed to increase the damping effects of the disk drive cover assembly 18 on both the structure-borne noises and airborne noises emanating from disk drive 10.

What is claimed is:

1. A disk drive cover assembly for damping noise associated with operation of a disk drive, the cover assembly comprising:
   first and second substantially-planar rigid members each having a major surface;
   a compressible member of a foam composition placed in between the major surfaces wherein the compressible member is characterized by an unconstrained thickness d1; and
   means for fixing the major surfaces and the compressible member in a stacked relationship such that the compressible member is compressed to a thickness of less than d1;
   wherein the cover assembly is fixed to a disk drive base having a cavity to thereby form a chamber to collectively house a head stack assembly and a data storage disk and wherein a printed circuit board is mounted to the base outside of the chamber away from the cover assembly.

2. A disk drive cover assembly as defined in claim 1, wherein the foam composition comprises at least one of an open cell type, a closed cell type, a semi-open cell type and a semi-closed cell type.

3. A disk drive cover assembly as defined in claim 1, wherein the foam composition comprises a polyvinylchloride foam.

4. A disk drive cover assembly as defined in claim 1, wherein the foam composition comprises a polyethylene foam.

5. A disk drive cover assembly as defined in claim 1, wherein the unconstrained thickness is approximately 0.003 inches.

6. A disk drive cover assembly as defined in claim 1, wherein the compressed thickness is approximately (d1)/3.

7. A disk drive cover assembly as defined in claim 1, the major surfaces further comprising:
   a plurality of bosses formed on one of the major surfaces, and a plurality of receiving complementary cavities formed on the other major surface wherein each boss is positioned for pairing with one of the cavities, and wherein the means for fixing the major surfaces comprises an adhesive applied to at least one of the boss and the cavity for adhering the bosses to the cavities.

8. A disk drive cover assembly as defined in claim 7, wherein the at least one of the cavities comprises a trough for containing excess adhesive.

9. A disk drive cover assembly as defined in claim 1, wherein the first and the second members comprise stainless steel.

10. A disk drive cover assembly as defined in claim 1, wherein the first and the second members comprise an aluminum alloy.

11. A disk drive cover assembly as defined in claim 1, wherein the major surfaces are co-extensive.

12. A disk drive cover assembly as defined in claim 1, wherein the first and second rigid members have a plurality of edges and wherein the means for fixing the major surfaces comprises a plurality of fasteners associated with the edges for securing the members to each other.

13. A disk drive comprising:
   a head disk assembly in communication with a printed circuit board assembly, the head disk assembly comprising:
   a) a disk drive base having a cavity and a disk drive cover assembly that is fixed to the disk drive base thereby forming a chamber to collectively house a head stack assembly and a data storage disk mounted on a spindle motor assembly for rotating the storage disk, wherein the printed circuit board is mounted to the base outside of the chamber away from the cover assembly, wherein the disk drive cover assembly comprises:
   first and second substantially-planar rigid members having major surfaces;
   a compressible member of a foam composition placed in between the major surfaces wherein the compressible member is characterized by an unconstrained thickness d1; and
   means for fixing the major surfaces and the compressible member in a stacked relationship to compress the compressible member to a thickness less than d1; and
   b) means for fixing the disk drive cover assembly to at least one of the head stack assembly and the spindle motor assembly.

14. A disk drive as defined in claim 13, wherein the foam composition comprises at least one of an open cell type, a closed cell type, a semi-open cell type and a semi-closed cell type.

15. A disk drive as defined in claim 13, wherein the foam composition comprises a polyvinylchloride foam.

16. A disk drive as defined in claim 13, wherein the foam composition comprises a polyethylene foam.

17. A disk drive as defined in claim 13, wherein the major surfaces are co-extensive.

18. A disk drive as defined in claim 13, wherein the first and second rigid members have a plurality of edges and a plurality of fasteners associated with the edges for securing the cover assembly to the disk drive base.

19. A disk drive as defined in claim 13, wherein the disk drive cover assembly further comprises a plurality of openings each positioned over a corresponding screw-hole bored in a predetermined surface of a member in each of the head stack assembly and the motor assembly, wherein the means for fixing the disk drive cover assembly comprises a plurality of downwardly-directed screws each of which are received in the corresponding screw-hole through the opening to secure the cover assembly to the head stack assembly and the spindle motor assembly.

20. A disk drive as defined in claim 13, wherein the disk drive cover assembly substantially covers the head stack assembly, the data storage disk and the spindle motor assembly.

* * * * *